Nov. 24, 1964    H. S. GREEN    3,158,341
SUPPORT SYSTEM FOR AIRCRAFT ARRESTING CABLES
Filed July 19, 1962

INVENTOR
Howard Saunders Green
BY *Herbert M. Birch*
ATTORNEY 3,158,341
SUPPORT SYSTEM FOR AIRCRAFT ARRESTING CABLES
Howard Saunders Green, Wilmington, Del., assignor to All American Engineering Company, Wilmington, Del., a corporation of Delaware
Filed July 19, 1962, Ser. No. 210,931
4 Claims. (Cl. 244—110)

The present invention relates to support means for arrest cables for mobile objects, such as aircraft travelling on a landing surface.

It is the practice to stretch a cable over a landing surface in position to be engaged by the arrest hook or some depending member of an aircraft, whereby the aircraft may be decelerated and stopped safely on short landing areas. Such cables are generally called arresting pendant or cables and for most efficient action such cables must be supported above the level of the landing surface or the arrest hook or the like on the aircraft may miss engagement therewith.

An object of this invention is to provide a novel arrest pendant or cable support system adapted to span a portion of a landing surface, which support system is easily positioned on and removed from the landing surface with no positive connections or attachments to the landing surface, whereby there is no interference with landing surface cleaning or maintenance.

Another object is to provide a novel arrest cable support arrangement wherein each of the elements thereof may be readily replaced by either skilled or unskilled labor when necessary and further, wherein the support elements are not such as to be dangerous obstructions in the path of the aircraft landing wheels.

Other objects and advantages will become apparent in the course of the following detailed description, taken in connection with the accompanying drawing, wherein.

*Embodiment One*

Figure 1:
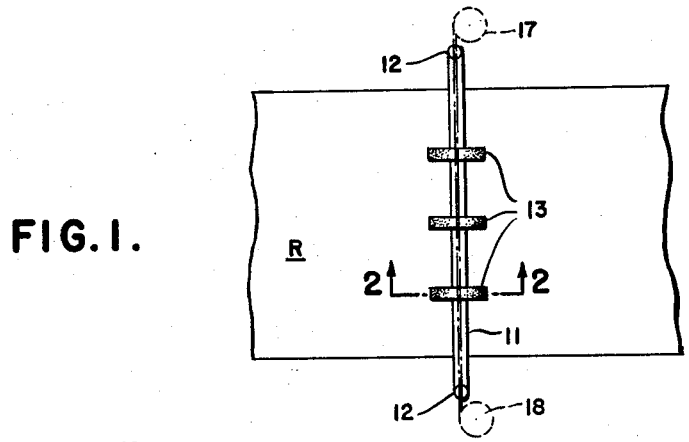
FIGURE 1 is a top plan view of a landing surface or aircraft runway showing the embodiment of an arrest cable support means mounted on the same.
Figure 2:
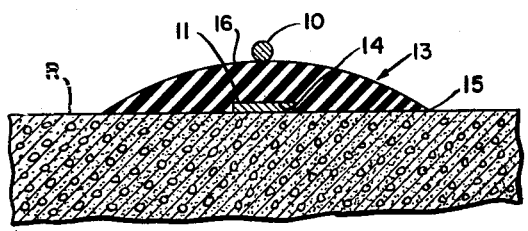
FIGURE 2 is a cross section view taken on the section line 2—2 of FIGURE 1.

Referring in detail to the first embodiment of the invention illustrated in FIGURES 1 and 2, there is a runway or landing surface R with a transverse arrest cable or runway pendant 10. A base strap 11 is stretched reasonably taut across the surface R and rests upon the surface thereof. The strap 11 is suitably secured at each end to an anchoring device 12, one on each side of the runway. This anchoring device may be any suitable device for the purpose, for example, simply a stake to hold hand tension on the strap 11.

The actual cable support elements 13 for cable 10 are attached to the strap 11 by flush seating in a bottom groove 14 formed in the elements and the same may frictionally engage with longitudinal side edges of the strap, which for this purpose are preferably made of some predetermined thickness. The strap 11 may be of any suitable material, such as metal, webbings of cotton, rayon or nylon, solid rubber, neoprene or plastic.

If found necessary the cable support elements 13 and the strap 11 may be secured together by suitable adhesive, such as epoxy resin or the like. Also, each support element is preferably crescent-shaped in the provision of a flat base surface 15 with the said groove 14 and an arcuate top surface 16 upon which rests the arrest cable 10, as it spans the runway surface R across the longitudinally spaced support elements 13 secured to the strap 11.

The support elements 13 may be of any desirable supporting material, such for example as metal, rubber, neoprene or plastic. However, metal is not preferred since any sparks caused by metal contact with a hard concrete landing area would be dangerous and provide a possible fire hazard. When the runway surface is wood, dirt or the like and frictional sparking is not a hazard, however, aluminum due to its light weight is sometimes very desirable.

As schematically shown in FIGURE 1, the arrest cable or runway surface pendant 10 may be wound around arrest engines 17 and 18 supported adjacent each side of the landing surface R. Such arrest engines, for example, may be like those illustrated in the copending application of Donald B. Doolittle, Serial No. 177,493, filed March 5, 1962 and assigned to the assignee of the present invention, or the arrest pendant 10 may be reeved over sheaves and connected to arresting means such as shown in U.S. Patent 2,777,653 issued to Donald B. Doolittle and also assigned to the present assignee.

*Embodiment Two*

Figure 3:
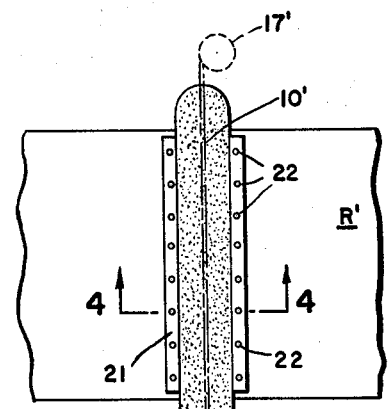
FIGURE 3 is a top plan view of a landing surface of aircraft runway showing a second embodiment of an arrest cable support means in the form of an inflatable belt mounted on the same.
Figure 4:
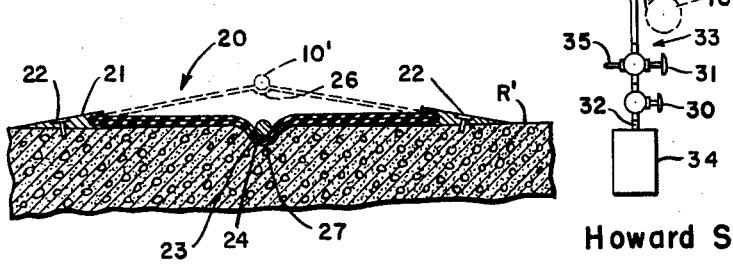
FIGURE 4 is a cross section view taken on the section line 4—4 of FIGURE 3.

A second embodiment is illustrated in FIGURES 3 and 4 and may generally be termed an inflatable and deflatable belt system. In this embodiment the arresting cable or pendant 10' is supported by an inflatable belt 20, which is laid across a runway, such as R'. Leading and trailing transitional fittings 21 hold the belt in place by anchoring fasteners 22, although the anchoring fasteners may in some instances not be needed. These fasteners, as shown, are spikes or rivet-like members, the shanks of which penetrate and anchor into the runway surface R'.

A pair of superimposed channel contour grooves 23 and 24 are formed longitudinally in the belt 20 by molding, for example, and are complementary to a channel 25 formed in the runway R'. The channel may be directly below and in vertical alignment with concavo-convex beads 26 and 27 molded in the adjacent plies of the belt, to thereby lay in the channel groove 25 formed in the runway R', see FIGURE 4. This arrangement provides for a flush runway surface belt position with the arresting pendant 10' when the belt is deflated or in retracted position, see FIGURE 4. The concave portion of the top ply of the belt bead 26 serves very efficiently to retain the taut arrest cable 10' in position when the belt 20 is inflated as shown in the dotted line position of FIGURE 4.

The belt is preferably of a flexible neoprene or rubber and when inflated the belt will raise the arresting cable or pendant 10' and support it above the runway surface R'. Any suitable configuration for holding the pendant 10' may be provided as long as the same performs the function of suitable elevated support for the arresting pendant.

The fittings 21 may be of any suitable material, such as metal, rubber, neoprene or plastic and shaped and proportioned so as to be most suitable for runway attachment. The fittings may if preferred be molded directly to the sides of the inflatable belt, to provide a unitary structure.

The belt 20 is connected through inlet and exhaust valves 30 and 31 in an adaptor coupling 33 by a conduit, such as an air hose 32 from a compresser tank 34, see FIGURE 3. For example, to inflate the belt 20 inlet valve 30 is opened and outlet valve 31 is closed to prevent exhaust from outlet nipple 35, whereby air flows into the belt 20 through conduit 32 and the cable 10' is raised to cable support position and the inlet valve 30 is then closed. To deflate the belt 20 after the inlet valve 30 is closed at a predetermined belt inflated position, the exhaust valve 31 is simply opened and the air in the belt is exhausted from exhaust outlet nipple 35, whereby the belt and the cable 10′, the cable being relatively of considerable weight, drop by gravity into flush runway position in the cable receiving retract channel 25 in the surface of runway R′. The exhaust valve 31 may be replaced by a suitable exhaust pump for rapid operation.

After each arrest is made the arrest cable 10 or 10′ of either embodiment is retrieved to original arrest position on the support means by suitable retrieve means, such as is well-known in the art and one of such retrieve systems is illustrated in the foregoing referenced Patent 2,777,653.

Without further description it is believed that the advantages of the present invention over the prior art is apparent and while only two embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. A cable support system and a landing surface for support of aircraft arrest pendants across a landing surface comprising an inflatable belt normally in a deflated position with the walls of the belt in contiguous two-ply position flat against the landing surface, a transverse recess across the landing surface, and a concavo-convex groove molded into each contiguous ply portion of the belt in nested relation and in said landing surface recess when the belt is deflated, said mold grooves when the belt is inflated separating and one of said grooves engaging a portion of said arrest pendant.

2. An aircraft arrest cable support system for runway surfaces comprising support means with a substantially flat base surface for resting on the runway surface and a convex top surface on the transverse mid-point of which rests portions of an aircraft arrest cable, and elongated positioning means transverse the said runway and the said flat base surface of the support means for retaining said support cable supporting means in position on the runway surface prior to an arrest action said elongated positioning means on said base surface comprising a strap secured in a groove in the flat base surface of said support means.

3. An aircraft arrest cable support for runway surfaces comprising cable engaging support means with a convex top and base, elongated retainer means transverse the runway surface for said cable engaging support means and anchor means securing said elongated retainer means in position on the runway surface.

4. An aircraft arrest cable support for runway surfaces comprising cable engaging support means with a convex top and base, elongated retainer means transverse the runway surface for said cable engaging support means and means securing said retainer means in position on the runway surface, said elongated retainer means being a strap and said securing means for said retainer means comprising an anchoring device on each side of the runway surface secured to opposite ends of the strap.

References Cited in the file of this patent
UNITED STATES PATENTS

| | | |
|---|---|---|
| 2,526,541 | Colley | Oct. 17, 1950 |
| 2,844,340 | Daniels et al. | July 22, 1958 |
| 3,010,683 | Cotton | Nov. 28, 1961 |
| 3,086,735 | Radovitz et al. | Apr. 23, 1963 |

OTHER REFERENCES

Flight, Sept. 2, 1960.